US006276036B1

(12) United States Patent
Cairns

(10) Patent No.: US 6,276,036 B1
(45) Date of Patent: Aug. 21, 2001

(54) MOTORCYCLE FORK TUBE BUSHING AND SEAL DRIVER

(76) Inventor: Ronald W. Cairns, 83 Madrid Pl., Freemont, CA (US) 94539

( * ) Notice: Subject to any disclaimer, the term of this patent is extended or adjusted under 35 U.S.C. 154(b) by 0 days.

(21) Appl. No.: 09/358,978

(22) Filed: Jul. 22, 1999

(51) Int. Cl.[7] ....... B23P 19/02

(52) U.S. Cl. ....... 29/235; 29/402.02; 29/259

(58) Field of Search ....... 29/235, 263, 265, 29/256, 258, 259, 898.08, 426.5

(56) References Cited

U.S. PATENT DOCUMENTS

| | | | | |
|---|---|---|---|---|
| 3,942,234 | * | 3/1976 | Kepler | 29/201 |
| 4,141,129 | * | 2/1979 | Martinit | 29/235 |
| 4,502,197 | * | 3/1985 | Harder | 29/259 |
| 5,174,006 | * | 12/1992 | Ellis | 29/275 |
| 5,709,018 | * | 1/1998 | Dugan | 29/235 |
| 5,893,202 | * | 4/1999 | Graham et al. | 29/402.02 |
| 6,038,753 | * | 3/2000 | Willett | 29/235 |

* cited by examiner

*Primary Examiner*—Derris H. Banks
*Assistant Examiner*—Daniel Shanley
(74) *Attorney, Agent, or Firm*—Cherskov & Flaynik

(57) ABSTRACT

A bushing and seal driver 10 for motorcycle fork tubes that includes opposing bushing and seal ends 18 and 20 configured and longitudinally dimensioned to insert a corresponding bushing 30 or seal 38 into a motorcycle fork tube 16 a predetermined distance by an individual causing one forceful "strike" from the bushing or seal ends 18 and 20 of the driver 10 against the bushing 30 or seal 38 thereby eliminating the visual gauging of the bushing 30 or seal 38 positions inside the fork tube 16, as is required when employing multiple strikes against the bushing 30 or seal 38.

13 Claims, 7 Drawing Sheets

MOTORCYCLE FORK TUBE BUSHING AND SEAL DRIVER

BACKGROUND OF THE INVENTION

1. Field of the Invention

The present invention relates generally to bushing and seal drivers and, more particularly, to hand held bushing and seal drivers for motorcycle fork tubes.

2. Background of the Prior Art

Hand held metal drivers are commonly used to insert bushings and seals into motorcycle fork tubes after internal repairs to the fork tube have been completed. Prior art drivers utilize only one end for engaging either a bushing and/or seal. The selected end has a longitudinal dimension that is capable of inserting the bushing (the bushing is inserted a greater distance into the fork tube than the insertion distance of the seal) beyond the insertion distance required. The insertion technique for the bushing and seal used by one of ordinary skill in the art, is to drive the bushing or seal a certain distance inside the fork tube, then remove the engagement end of the driver from the fork tube, and view the insertion distance of either the bushing or seal into the fork tube. This method is repeated until the busing or seal has been forcibly inserted the required distance inside the fork tube. This hit and view technique is utilized by Suzuki's fork seal driver, Part Number 09940-32720. The problem with this installation method is that the required insertion dimension of either the busing or seal into the fork tube can be easily exceeded, even by an individual with significant experience with fork tube bushing and seal installation. A driver is required that removes the guess work from the installation of bushings and seals inside motorcycle fork tubes. Also, a driver is required that allows an individual repairing fork tubes, to cause only one forceful "strike" of the driver with the bushing or seal to thereby position the bushing or seal a preselected distance inside the fork tube.

SUMMARY OF THE INVENTION

It is an object of the present invention to provide a motorcycle fork tube seal and bushing driver to overcome many of the disadvantages of the prior art.

A principle object of the present invention is to provide a driver that allows an individual to quickly and easily insert a bushing and seal into a fork tube with only a single device. A feature of the driver is that opposing ends have outer longitudinal walls with different longitudinal lengths. An advantage of the device is that the bushing can be inserted into the fork tube a longitudinal dimension different than the longitudinal insertion dimension of the seal.

Still a further object of the present invention is to enable an individual operating the driver to easily grasp and slide the driver upon an inner member of the fork tube. A feature of the driver is a recess in an outer wall of a holding portion of the driver. An advantage of the driver is that the individual's hand will not "slip off" the driver when the driver forcibly urges the bushing and seal into the fork tube thereby preventing hand injuries.

Yet another object of the driver is to prevent the driver from inserting the bushing and seal into the fork tube an excessive longitudinal dimension. A feature of the driver is radial stopping walls perpendicularly joined to the outer walls of the bushing and seal ends of the driver. An advantage of the driver is that the stopping walls engage an outer edge portion of the fork tube thereby preventing excessive insertion of the bushing and seal.

Briefly, the intention provides a motorcycle fork tube seal and bushing driver comprising a relatively cylindrical unibody device having an aperture therethrough to snugly receive an inner member of a motorcycle fork tube, said device having a bushing end and an opposing seal end, said bushing end engaging a bushing ultimately inserted into the fork tube to a predetermined position, said seal end engaging a seal ultimately inserted into the fork tube to a predetermined position, said seal and bushing ends of said device having substantially cylindrical outer walls with respective diameters dimensioned to urge said seal and bushing ends to insert into the fork tube, said device having stopping walls formed from a holding portion of said device having an outer diameter substantially larger than the diameter of the outer walls of the seal and bushing ends, said stopping walls allowing said respective seal and bushing ends to insert into the fork tube a predetermined distance.

BRIEF DESCRIPTION OF THE DRAWINGS

The foregoing invention and its advantages may be readily appreciated from the following detailed description of the preferred embodiment, when real in conjunction with the accompanying drawings in which.

DESCRIPTION OF THE PREFERRED EMBODIMENT

Figure 1:
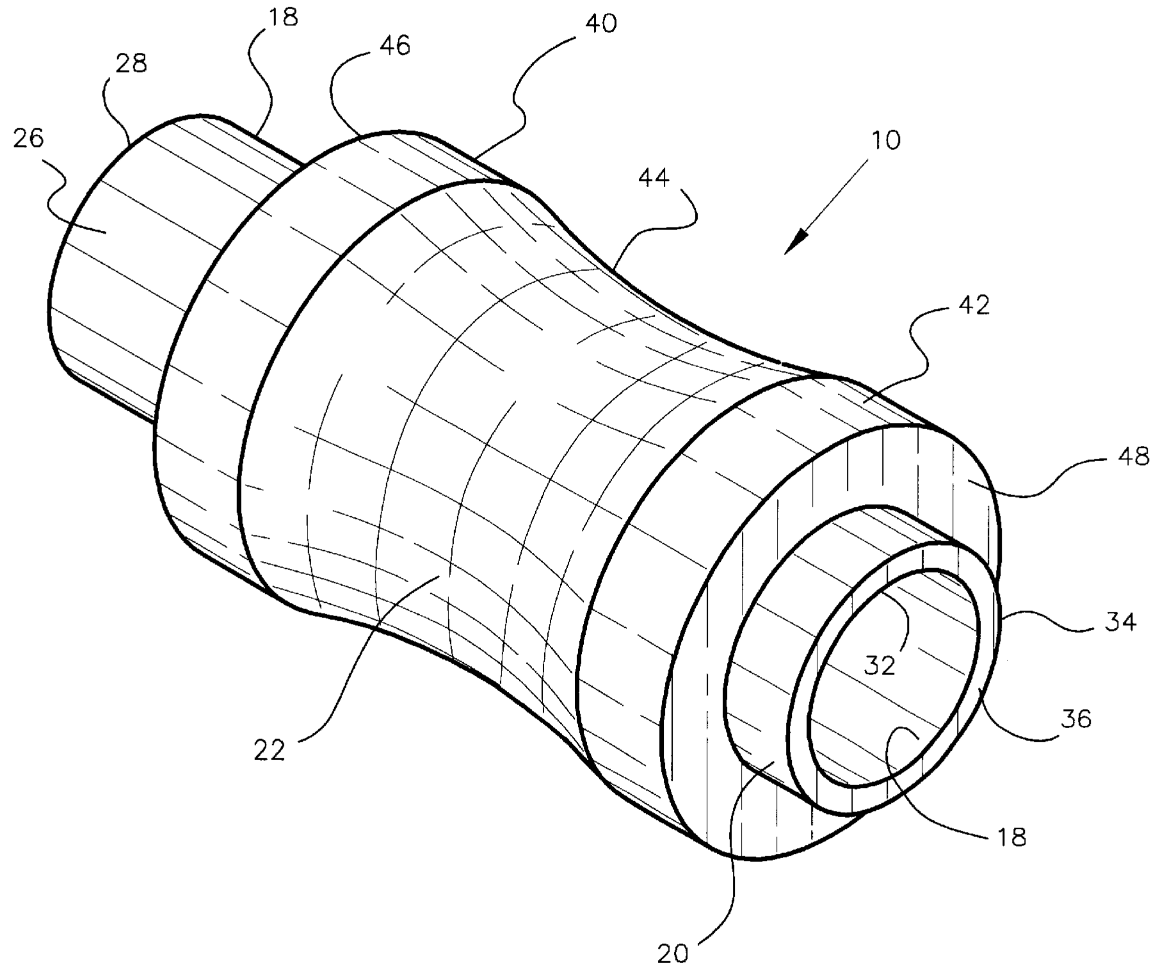
FIG. 1 is a perspective view of a motorcycle fork tube seal and bushing driver in accordance with the present invention.
Figure 2:
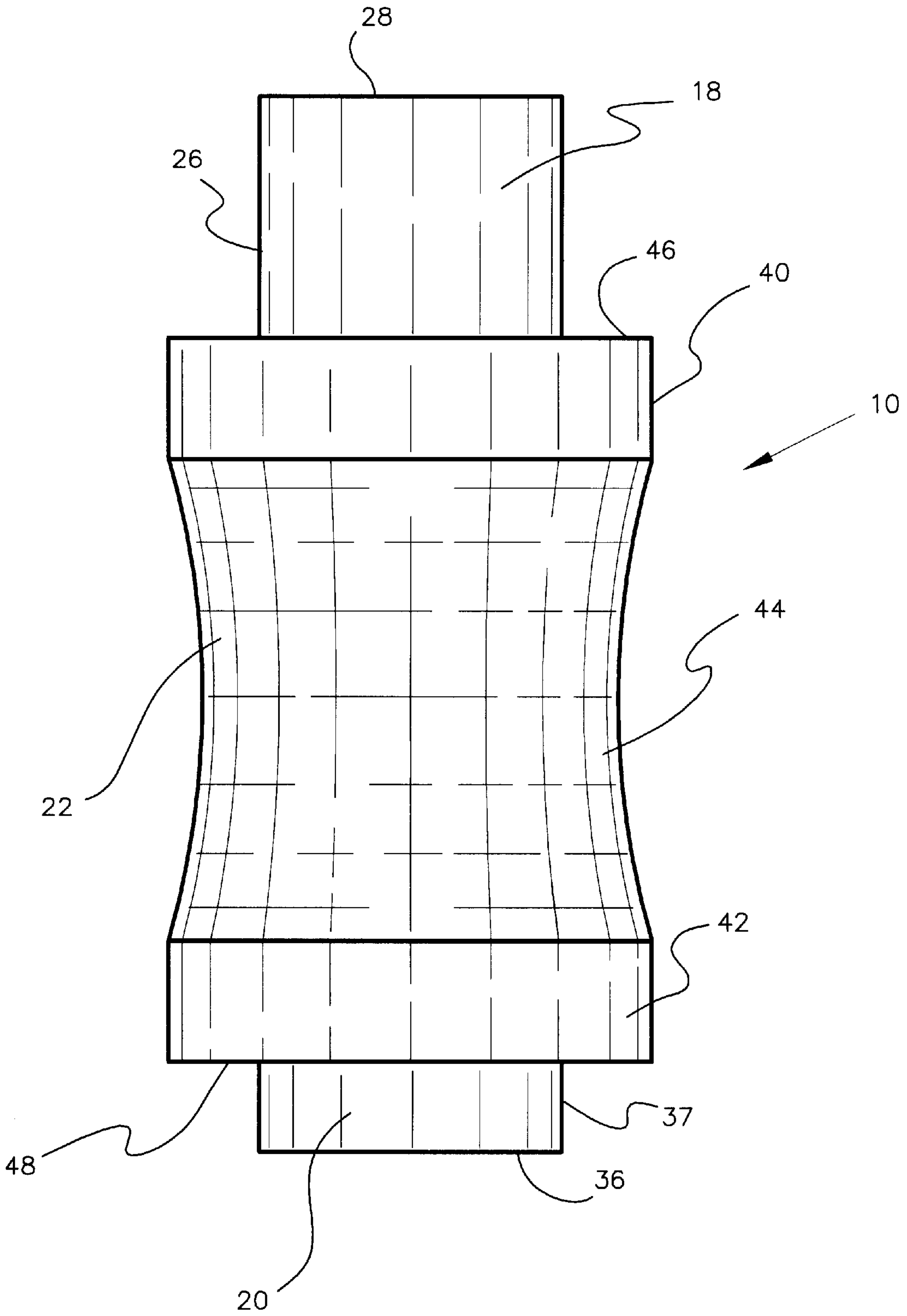
FIG. 2 is a front elevation view of the driver depicted in FIG. 1.
Figure 3:
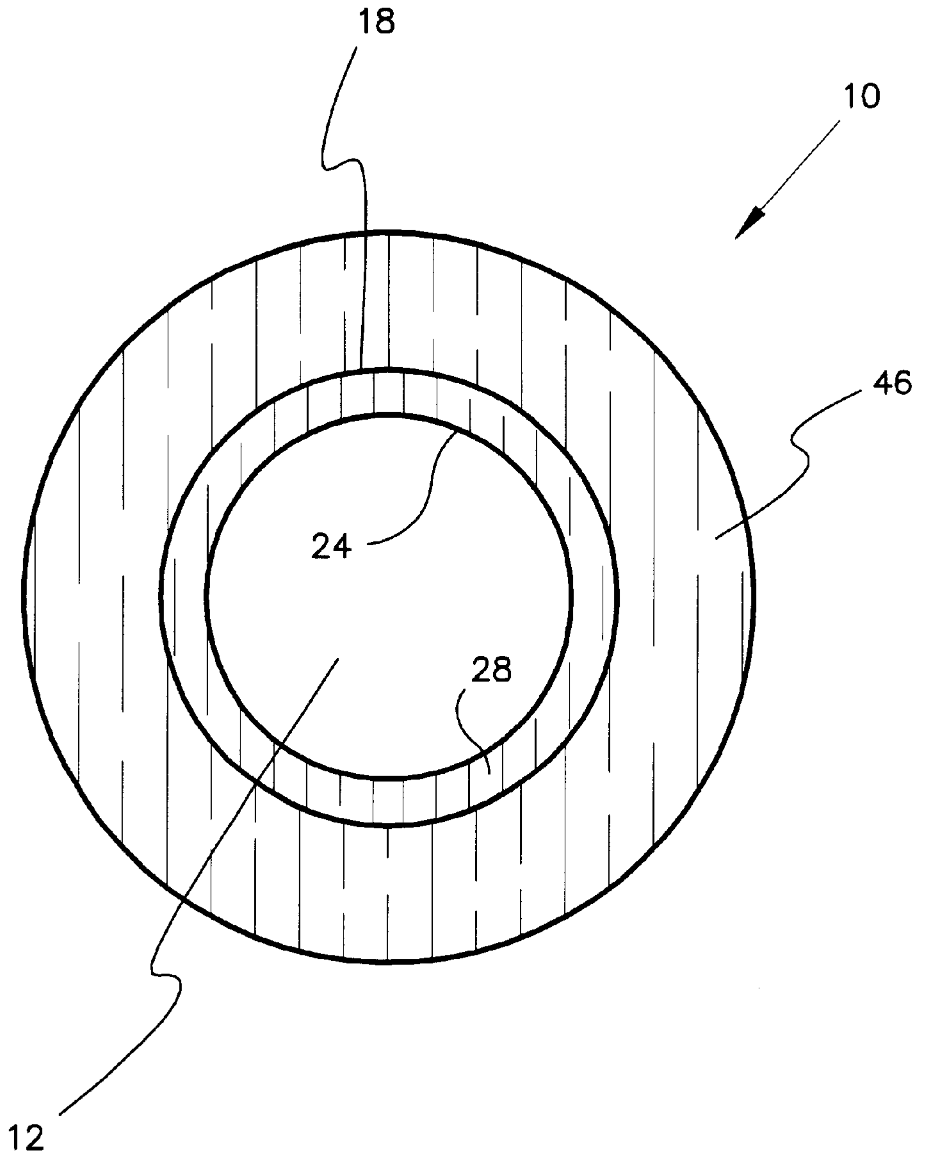
FIG. 3 is a top elevation view of the driver depicted in FIG. 1.
Figure 4:
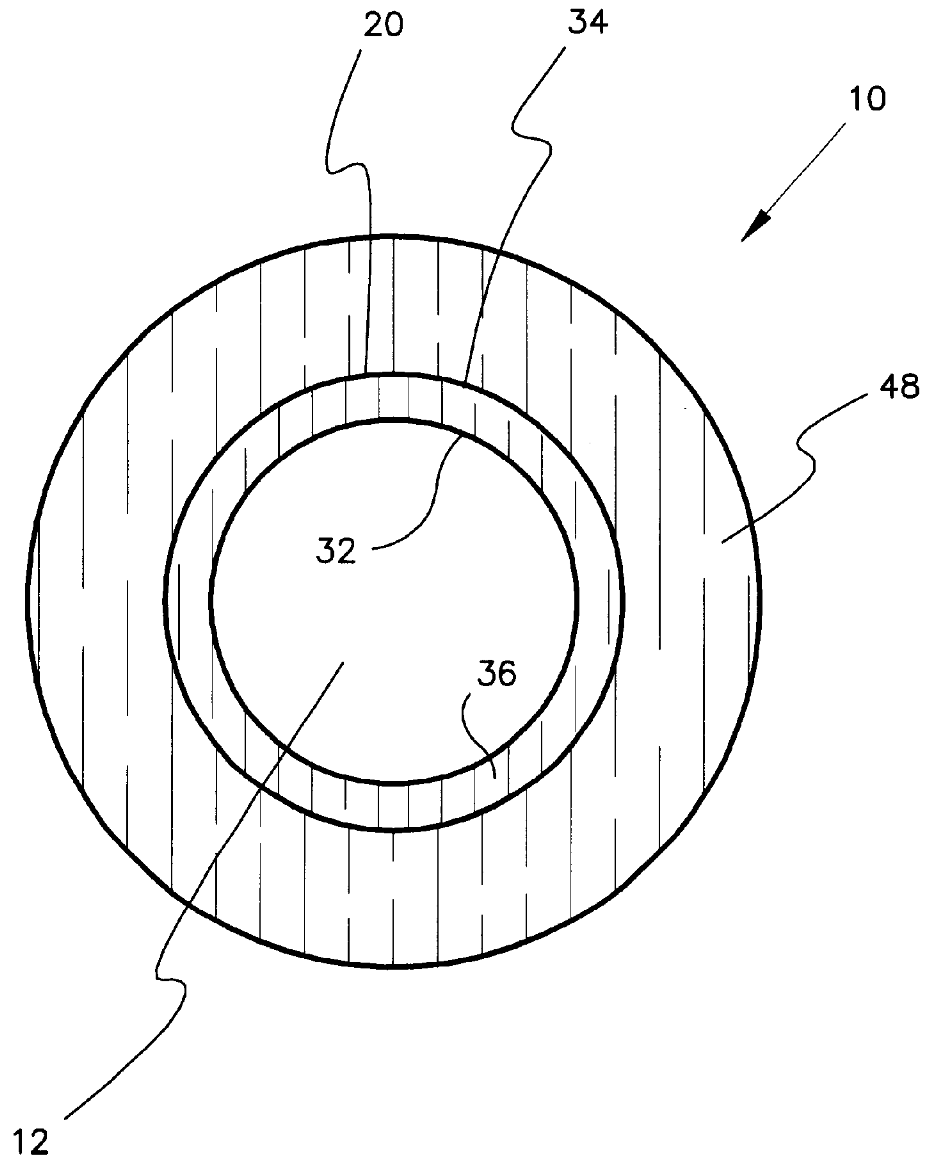
FIG. 4 is a bottom elevation view of the driver depicted in FIG. 1.
Figure 5:
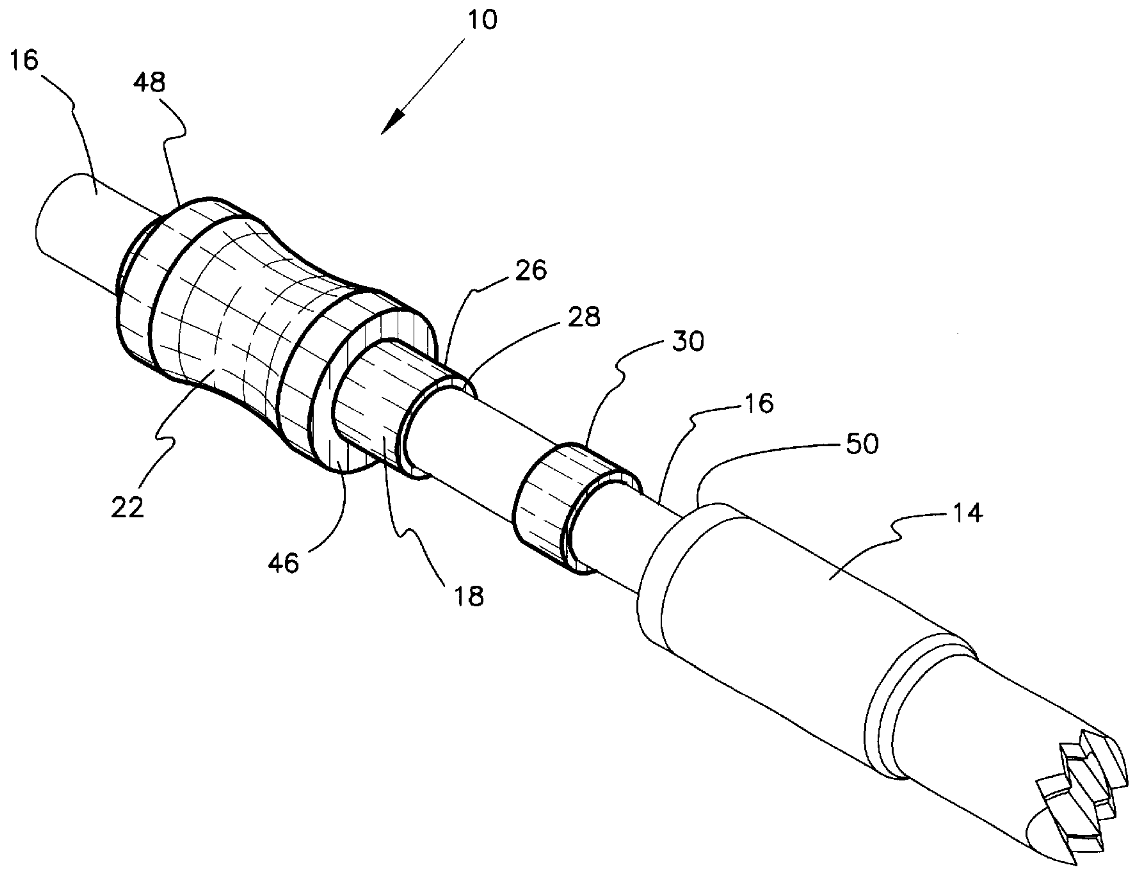
FIG. 5 is a perspective view of the driver positioned upon an inner member of a fork tube such that a bushing end of the driver ultimately engages a bushing to be inserted in the fork tube in accordance with the present invention.
Figure 6:
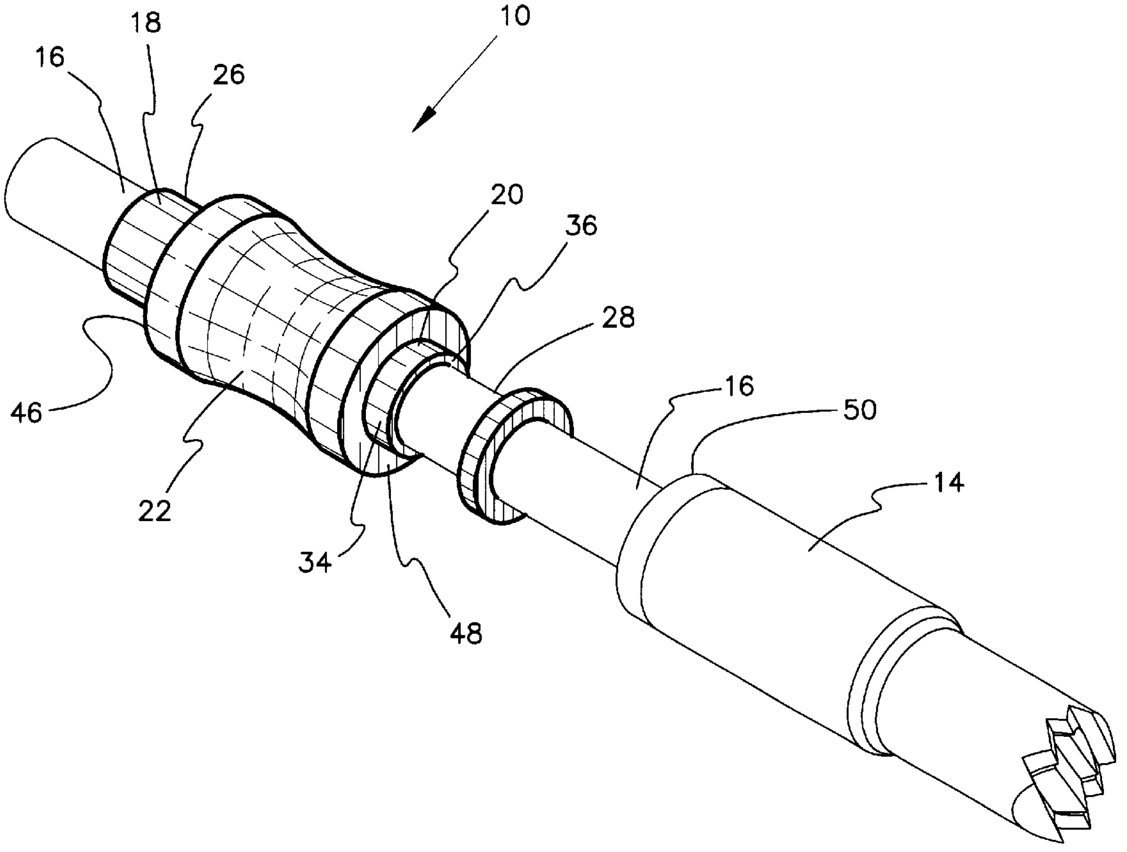
FIG. 6 is a perspective view of the driver positioned upon the inner member of the fork tube such that a seal end of the driver ultimately engages a seal to be inserted in the fork tube in accordance with the present invention.
Figure 7:
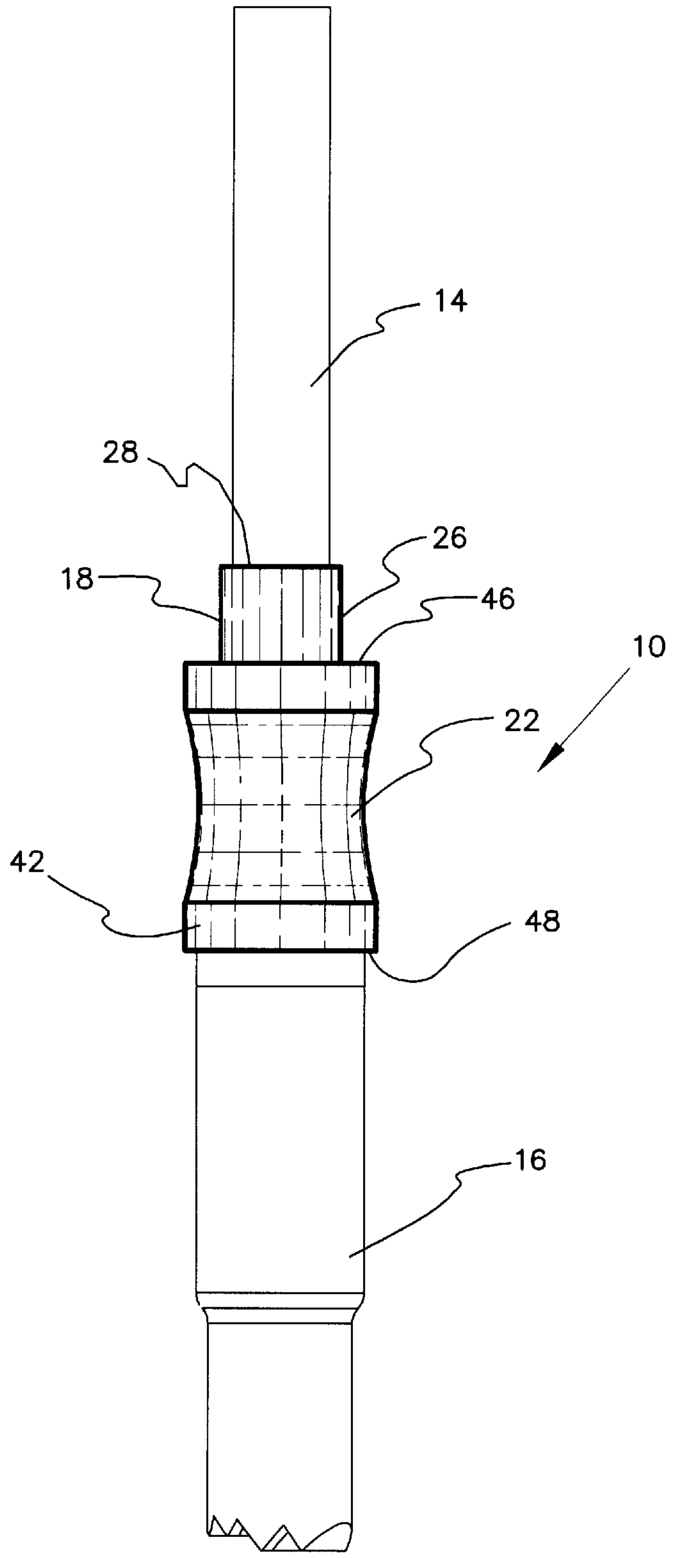
FIG. 7 is a front elevation view of the driver positioned upon the inner member of the fork tube with the seal end of the driver having inserted the seal inside the fork tube a predetermined dimension in accordance with the present invention.

Referring now to the drawings and in particular to FIGS. 14, perspective, front, top and bottom elevation views of a motorcycle fork tube seal and bushing driver in accordance with the present invention is denoted by numeral 10. The seal and bushing driver 10 is a relative cylindrically configured unibody member having an aperture 12 therethrough to snugly receive an inner member 14 of a motorcycle fork tube 16 (not part of the invention) as depicted in FIGS. 4–7. The seal and bushing driver 10 is fabricated from steel or other heavy materials capable of providing substantial driving force when "slid" upon the inner member 14 of the motorcycle fork tube 16.

The seal and bushing driver 10 includes a bushing end 18, an opposing seal end 20 and a holding portion 22 therebetween. The bushing end 18 includes inner and outer cylindrical walls 24 and 26 defining a bushing engagement wall 28 having sufficient surface area to urge a bushing 30 (not part of the invention) into the motorcycle fork tube 14 (see FIG. 5). The seal end 20 includes inner and outer cylindrical walls 32 and 34 defining a seal engagement wall 36 having sufficient surface area to urge a seal 38 (not part of the invention) into the motorcycle fork tube 16 (see FIGS. 6 and 7).

The holding portion 22 of the driver 10 includes upper and lower cylindrical walls 40 and 42, and a recess portion 44 positioned therebetween. The upper and lower walls 40 and 42 cooperate with the recess portion 44 such that a configuration is provided that allows an operator of the driver 10 to easily and securely grasp the driver 10 and forcefully slide the driver upon the inner member 14 of the fork tube 16 to ultimately position the bushing and seal 30 and 38 inside the fork tube 16. The upper and lower walls 40 and 42 of the holding portion perpendicularly join respective radial top and bottom walls 46 and 48 of the holding portion 22. The top and bottom walls 46 and 48 have substantially annular configurations that includes a radial dimension extending from the aperture 12 to respective upper and lower walls 40 and 42 The annular configuration of the top and bottom walls 46 and 48 must include a surface area sufficient to cooperatively engage a top wall 50 of the fork tube 16 thereby preventing further longitudinal movement of the driver 10 into the fork tube 16. The top and bottom walls 46 and 48 or "stopping walls," define the longitudinal insertion dimensions of the respective bushing and seal ends 18 and 20 into the fork tube 16. The insertion dimensions will vary depending on the manufacturer of the fork tube 16; however, the insertion dimension of the bushing 30 will be longer than the seal 38 thereby requiring the longitudinal dimension of the bushing end 18 to be longer than the longitudinal dimension of the seal end 20. The insertion dimensions of the seal is critical because no recesses or other indicators are provided inside the fork tube to provide insertion limits to the individual sliding the driver 10 to position the sea 38. Over inserting the seal 38, can result in oil leaking from the fork tube 16, thus creating a potentially life threatening condition. The bushing end 18 insertion dimension is not as critical as the seal end 20 insertion dimension due to a retainer ring recess (not shown) provided in the inner wall of the fork tube 16. The bushing end 18 insertion dimension need only be sufficient to position the bushing 30 slightly below the retaining ring recess.

In operation, a motorcycle fork tube 16 is to be reassembled. A bushing 30 is positioned upon the inner portion 14 of the fork tube 16. A motorcycle fork tube seal and bushing driver 10 is slid upon the inner member 14 such that a bushing engagement wall 28 of the bushing end 18 of the driver 10 contacts the bushing 30. The driver 10 is grasped at the holding portion 22 by an individual assembling the fork tube 16. The individual strikes the driver 10 against the bushing 30, forcing the bushing end of the driver 10 in combination with the bushing 30 to slide into the fork tube 16 until the top wall 46 of the driver 10 engages the top wall 50 of the fork tube 16. Thus, the bushing 30 is positioned at a predetermined insertion dimension corresponding to the longitudinal axial length of the bushing end 18 of the driver 10. The ultimate position of the bushing 30 will be slightly below a retaining ring recess in the inner wall of the fork tube 16. The driver 10 is then "slid off" the inner member 14 of the fork tube 16. A seal 38 is then slid upon the inner member 14. The driver 10 is then slid upon the inner member 14 of the fork tube 16 such that a seal engagement wall 38 of the seal end 20 contacts the seal 38. The individual assembling the fork tube 16 strikes the driver 10 against the seal 38, forcing the seal end 20 of the driver 10 in combination with the seal 38 to slide into the fork tube 16 until the bottom wall 48 of the driver 10 engages the top wall 50 of the fork tube 16. Thus, the seal 38 is positioned at a predetermined insertion dimension corresponding to the longitudinal axial length of the seal end 20 of the driver 10. The precisely inserted bushing and seal 30 and 38 provide a fork tube 16 that will operate safely irrespective of the road surface encountered.

The foregoing description is for purposes of illustrating only and is not intended to limit the scope of protection accorded this invention. The scope of protection is to be measured by the following claims, which should be interpreted as broadly as the inventive contribution permits.

What is claimed is:

1. A motorcycle fork tube seal and bushing driver comprising: a relatively cylindrical, unibody constructed hand held driver having an aperture therethrough that allows a motorcycle fork tube inner member that protrudes from a top wall of the motorcycle fork tube to slidably and snugly extend through said driver, said driver includes a bushing end, an opposing seal end and a holding portion therebetween that allows a person to grasp and forcibly slide said driver upon the inner member of the motorcycle fork tube, said bushing end ultimately engaging a bushing to forcibly slide the bushing upon the inner member of the fork tube until the bushing is inside the fork tube at a predetermined position, said seal end ultimately engaging a seal to forcibly slide the seal upon the inner member of the fork tube until the seal is inside the fork tube at a predetermined position, said seal and bushing ends of said driver having substantially cylindrical outer walls with respective diameters that allow said seal and bushing ends to snugly insert into the fork tube, said driver having stopping walls that allow said seal and bushing ends to insert into the fork tube a predetermined distance.

2. The fork tube seal and bushing driver of claim 1 wherein said holding portion of said device includes an outer wall configured to allow an individual to securely grip and slide said device upon the cylindrical inner member of the fork tube.

3. The driver of claim 2 wherein said device is fabricated from metal.

4. The driver of claim 2 wherein said outerwall of said holding portion includes a recess.

5. The driver of claim 1 wherein the longitudinal dimension of said device is relatively larger than the combined insertion dimensions of the seal and the bushing.

6. The driver of claim 1 wherein said seal end has a longitudinal dimension relatively shorter than the longitudinal dimension of said bushing end.

7. The driver of claim 1 wherein said bushing end has a longitudinal dimension relatively longer than the distance separating a top wall of the fork tube and a retaining ring recess inside the fork tube.

8. A seal and bushing driver comprising:

a driver member having a bushing end, an opposing seal end, a holding portion therebetween and a longitudinal aperture therethrough that removably receives an inner member of a motorcycle fork tube such that the inner member slidably and snugly extends through said driver to guide said driver into the motorcycle fork tube while said driver forcibly slides a bushing or a seal upon the inner member and ultimately into the motorcycle fork tube;

means for inserting the bushing inside the motorcycle fork tube a predetermined longitudinal dimension; and means for inserting the seal inside the motorcycle fork tube a predetermined longitudinal dimension.

9. The driver of claim 8 wherein said bushing insertion means includes a bushing end of said driver having an outer cylindrical wall with a longitudinal dimension corresponding to the predetermined longitudinal insertion dimension of the bushing, and a radial stopping wall perpendicularly joining said outer cylindrical wall, said stopping wall having a diameter relatively larger than the diameter of the fork tube.

10. The driver of claim 8 wherein said seal insertion means includes a seal end of said driver having an outer cylindrical wall with a longitudinal dimension corresponding to the predetermined longitudinal insertion dimension of the seal, and a radial stopping wall perpendicularly joining said outer cylindrical wall, said stopping wall having a diameter relatively larger than the diameter of the fork tube.

11. The driver of claim 8 wherein said holding portion includes an outer wall having a recess positioned between upper and lower cylindrical walls.

12. The device of claim 8 wherein said bushing end includes a radial engagement wall that contacts the bushing and forcibly urges the bushing into the fork tube when an individual slides said driver upon the inner member of the fork tube.

13. The device of claim 8 wherein said seal end includes a radial engagement wall that contacts the seal and forcibly urges the seal into the fork tube when an individual slides said driver upon the inner member of the fork tube.

* * * * *